(No Model.)
L. GODDU.
MECHANICAL MOVEMENT.
No. 581,818.                                   Patented May 4, 1897.
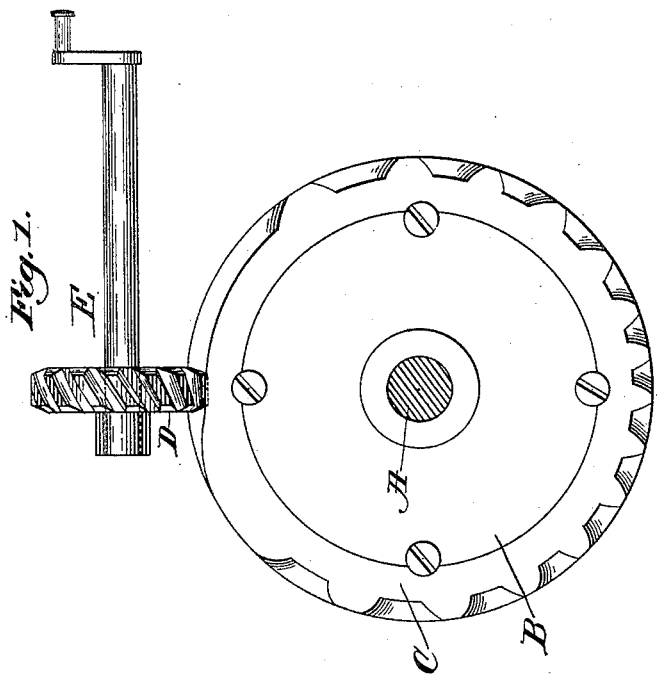
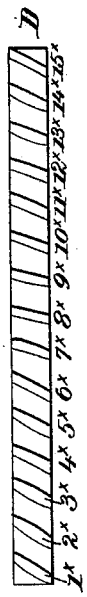
Witnesses.
Fred S. Greenleaf.
Thomas J. Drummond.
Inventor.
Louis Goddu.
By Crosby & Gregory
attys.

UNITED STATES PATENT OFFICE.

LOUIS GODDU, OF WINCHESTER, MASSACHUSETTS, ASSIGNOR TO JAMES W. BROOKS, TRUSTEE, OF PETERSHAM, MASSACHUSETTS.

MECHANICAL MOVEMENT.

SPECIFICATION forming part of Letters Patent No. 581,818, dated May 4, 1897.

Application filed April 11, 1896. Serial No. 587,182. (No model.)

*To all whom it may concern:*

Be it known that I, LOUIS GODDU, of Winchester, county of Middlesex, State of Massachusetts, have invented an Improvement in Mechanical Movements, of which the following description, in connection with the accompanying drawings, is a specification, like letters and numerals on the drawings representing like parts.

This invention has for its object the production of improved mechanism for producing from uniform continuous circular motion irregular synchronous circular motion, my invention being applicable for use in a great variety of machines.

Figure 1 shows my improved mechanism, and Figs. 2 and 3 show the special gears developed.

The uniformly-rotating main shaft A has fast on it the hub B of a driving-gear C, having a series of spiral teeth separated by spaces numbered from 1 to 15, the shape of which are best shown in the developed view of said gear shown in Fig. 3, the teeth between said spaces varying in angularity and in length, the longest tooth of least angularity being the one between the spaces 7 and 8.

The numbered spaces of the gear C receive in them the teeth of a gear D on the shaft E to be rotated at a variable speed, the said shaft having at its end a suitable driver or crank.

The teeth of the driven gear D are spirally arranged and correspond in number with the spaces in the gear C, the teeth $1^\times 2^\times$, &c., entering the spaces 1 2, &c., of the driving-gear C. The teeth of the gear D are not parallel, but rather differ somewhat in angularity, the tooth $8^\times$, which enters the longer space 8 of the gear C, being but slightly inclined from the center of the shaft E, and the teeth $1^\times$ and $15^\times$ being set at a less angle or at a greater inclination to the center of said shaft.

As the shaft A is rotated at a uniform speed the spaces of the gear C, acting on the teeth of the gear D, rotate the latter gear at a variable speed, the slowest motion of the gear D and the shaft E being when the tooth $8^\times$ enters the space 8. These two gears have the same number of teeth and spaces and are rotated synchronously.

The gears herein described are represented as of different diameter, but they may be of the same diameter, and the variation in angularity of the teeth or in the angularity and length may be varied to effect the desired retardation and acceleration of the motion, according to the necessity of the particular machine in which it may be used.

By the term "length of teeth of the spiral gears," as herein used, I mean the distance from one to the other end of each tooth measured on its face in the direction of the plane of rotation of the gear.

The mechanism forming the subject-matter of this application is shown in another application filed by me April 11, 1896, Serial No. 587,183, in connection with and to actuate the shuttle of a sewing-machine.

Having described my invention, what I claim, and desire to secure by Letters Patent, is—

1. As a means for producing variable circular motion from regular uniform circular motion, a shaft having a driving-gear provided with spiral teeth varying in angularity and length, and a second driven shaft having a gear provided with spiral teeth of varying angle, substantially as described.

2. In a mechanical movement, a driving and a driven gear each having an equal number of spiral teeth, the teeth in each gear varying in angularity and length, whereby uniform rotation of the driving-gear will rotate the driven gear synchronously and at a variable speed, substantially as described.

In testimony whereof I have signed my name to this specification in the presence of two subscribing witnesses.

LOUIS GODDU.

Witnesses:
 GEO. W. GREGORY,
 JOHN C. EDWARDS.